US012044189B2

(12) United States Patent
Mitsuoka

(10) Patent No.: US 12,044,189 B2
(45) Date of Patent: Jul. 23, 2024

(54) ENGINE CONTROL DEVICE

(71) Applicant: TOYOTA JIDOSHA KABUSHIKI KAISHA, Toyota (JP)

(72) Inventor: Ryuhei Mitsuoka, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 18/459,621

(22) Filed: Sep. 1, 2023

(65) Prior Publication Data

US 2024/0141848 A1 May 2, 2024

(30) Foreign Application Priority Data

Nov. 1, 2022 (JP) ................................ 2022-175471

(51) Int. Cl.
*F02D 41/18* (2006.01)
*F02D 41/00* (2006.01)
*F02D 41/14* (2006.01)

(52) U.S. Cl.
CPC ....... *F02D 41/182* (2013.01); *F02D 41/0002* (2013.01); *F02D 41/1454* (2013.01); *F02D 41/1482* (2013.01)

(58) Field of Classification Search
CPC ............... F02D 41/182; F02D 41/0002; F02D 41/1454; F02D 41/0035; F02D 41/1475; F02D 41/1482; F02D 41/1486
See application file for complete search history.

(56) References Cited

U.S. PATENT DOCUMENTS

| | | | | |
|---|---|---|---|---|
| 6,438,946 B1 * | 8/2002 | Majima | F01N 13/0093 | 60/299 |
| 7,168,422 B1 * | 1/2007 | Takata | F02D 41/1495 | 123/674 |
| 2008/0147297 A1 * | 6/2008 | Nakagawa | F02D 41/1441 | 60/299 |
| 2008/0256929 A1 * | 10/2008 | Sugimoto | F02D 41/0235 | 60/285 |
| 2015/0167570 A1 * | 6/2015 | Yasui | F02D 41/0052 | 60/285 |
| 2021/0095610 A1 * | 4/2021 | Hashimoto | F01P 3/02 | |

FOREIGN PATENT DOCUMENTS

JP 2022-84191 A 6/2022

* cited by examiner

*Primary Examiner* — Syed O Hasan
(74) *Attorney, Agent, or Firm* — Oblon, McClelland, Maier & Neustadt, L.L.P.

(57) ABSTRACT

An engine control device includes a determination unit configured to determine whether or not an engine is in a complete explosion state, a calculation unit configured to calculate an integrated intake air amount that is an integrated value of an intake air amount of the engine after an affirmative determination is made by the determination unit, a setting unit configured to set a target equivalent ratio of the engine in accordance with the integrated intake air amount, and a control unit configured to control an intake air amount and a fuel injection amount of the engine such that an equivalent ratio of an air-fuel mixture becomes the target equivalent ratio.

3 Claims, 3 Drawing Sheets

ENGINE CONTROL DEVICE

CROSS-REFERENCE TO RELATED APPLICATION

This application is based upon and claims the benefit of priority of the prior Japanese Patent Application No. 2022-175471, filed on Nov. 1, 2022, the entire contents of which are incorporated herein by reference.

TECHNICAL FIELD

The present disclosure relates to an engine control device.

BACKGROUND

A target equivalent ratio of the engine is set in accordance with an integrated intake air amount which is an integrated value of the intake air amount of the engine. An operating state of the engine is controlled so that the actual equivalent ratio of the air-fuel mixture becomes the target equivalent ratio (see, for example, Japanese Unexamined Patent Application Publication No. 2022-084191).

The engine is started in the following manner. Fuel injection is performed while intake air is introduced into the engine by cranking. The air-fuel mixture is ignited and the engine is brought into a complete explosion state. Thus, the start of the engine is completed. Here, the time from the start of cranking to the complete combustion state might vary depending on factors such as the properties of the fuel used and the environmental temperature. Therefore, in the case where the integrated intake air amount is calculated from the start of cranking, there is a possibility that the integrated intake air amount at the time when the complete combustion state is reached varies. As a result, the target equivalent ratio set in accordance with the integrated intake air amount might vary. Therefore, the combustion state of the engine after the start might vary.

SUMMARY

It is therefore an object of the present disclosure to provide an engine control device in which variation in combustion state after starting is suppressed.

The above object is achieved by an engine control device including: a determination unit configured to determine whether or not an engine is in a complete explosion state; a calculation unit configured to calculate an integrated intake air amount that is an integrated value of an intake air amount of the engine after an affirmative determination is made by the determination unit; a setting unit configured to set a target equivalent ratio of the engine in accordance with the integrated intake air amount; and a control unit configured to control an intake air amount and a fuel injection amount of the engine such that an equivalent ratio of an air-fuel mixture becomes the target equivalent ratio.

The setting unit may be configured to set the target equivalent ratio from a value greater than one to a lower value as the integrated intake air amount increases.

The setting unit may be configured to set the target equivalent ratio to a value greater than one as a temperature of the engine is lower.

DETAILED DESCRIPTION

[Schematic Configuration of Engine]

Figure 1:
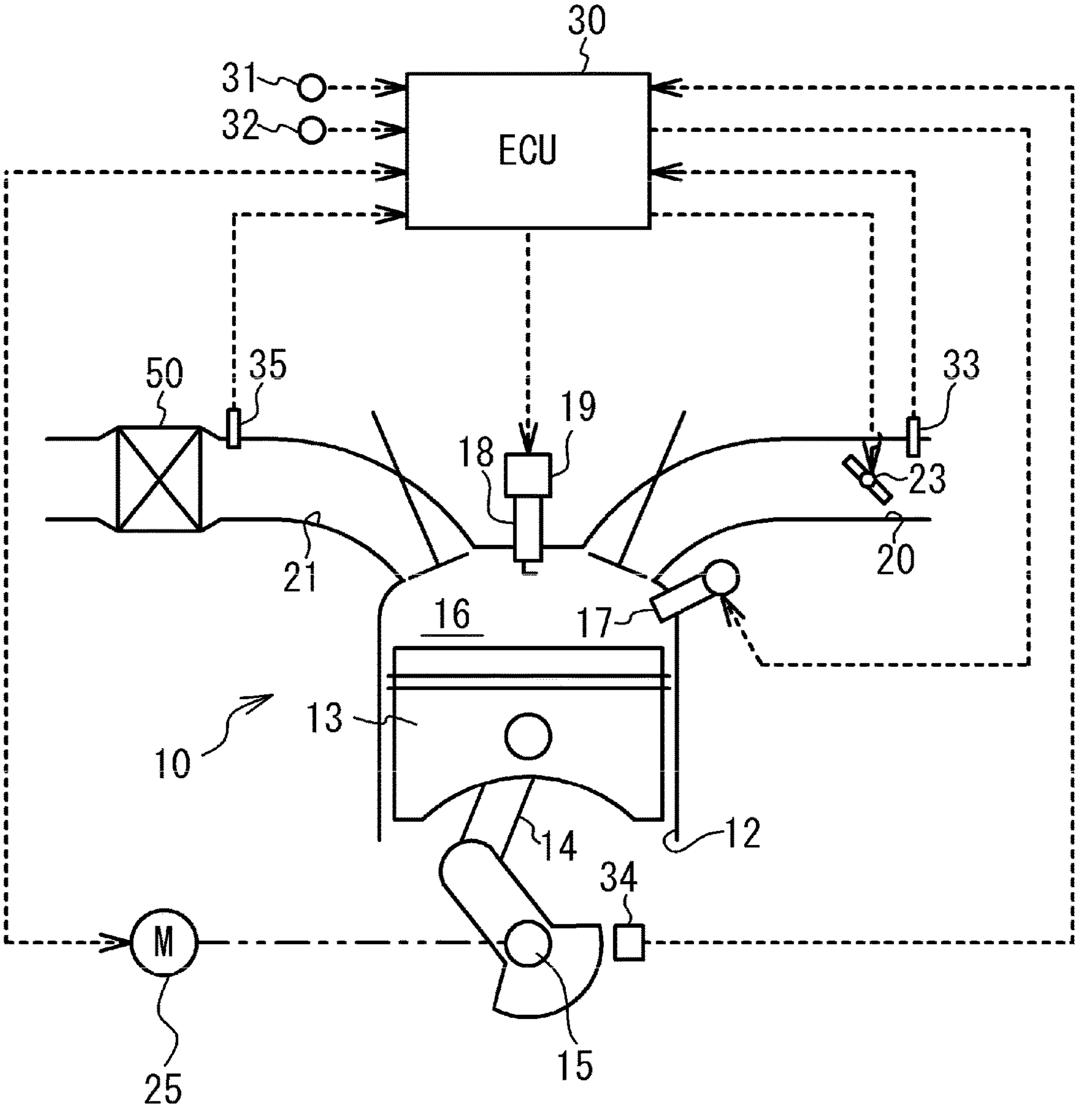
FIG. 1 is a schematic configuration view of an engine.

FIG. 1 is a schematic configuration view of an engine 10. The engine 10 is mounted on an engine vehicle, for example, but may be mounted on a hybrid vehicle. The engine 10 is a gasoline engine, but may be a diesel engine. A piston 13 is provided in each cylinder 12 of the engine 10. The piston 13 is connected to a crankshaft 15, which is an output shaft of the engine 10, via a connecting rod 14. The reciprocating motion of the piston 13 is converted into a rotational motion of the crankshaft 15 by the connecting rod 14. The crankshaft 15 is connected to a starter motor 25. The starter motor 25 is connected to the crankshaft 15. The starter motor 25 cranks the engine 10 by rotating the crankshaft 15 when the engine 10 is started.

A combustion chamber 16 is formed in each cylinder 12 above the piston 13. An ignition plug 18 for igniting an air-fuel mixture of fuel and air is attached to the combustion chamber 16. The ignition timing of the air-fuel mixture by the ignition plug 18 is adjusted by an igniter 19 provided above the ignition plug 18.

An intake passage 20 and an exhaust passage 21 communicate with the combustion chamber 16. The intake passage 20 is provided with a throttle valve 23 for adjusting the amount of air introduced into the combustion chamber 16. A catalyst 50 is provided in the exhaust passage 21.

The engine 10 is provided with an in-cylinder injection valve 17 that injects fuel into each combustion chamber 16. In addition to or instead of the in-cylinder injection valve 17, a port injection valve that injects fuel into an intake port may be provided.

An ECU (Electronic Control Unit) 30 is an electronic control unit that performs control processing related to the engine 10. The ECU 30 is mainly configured by a computer including a central processing unit (CPU) and a volatile or nonvolatile memory such as a random access memory (RAM) or a read only memory (ROM). Various sensors are connected to the ECU 30, which will be described in detail later. The ECU 30 is an example of an engine control device, and functionally achieves a determination unit, a calculation unit, a setting unit, and a control unit, which will be described in detail later.

An accelerator opening degree sensor 31, a coolant temperature sensor 32, an air flow meter 33, a crank angle sensor 34, and an air-fuel ratio sensor 35 are connected to the ECU 30. The accelerator opening degree sensor 31 detects an accelerator opening degree. The coolant temperature sensor 32 detects the temperature of the coolant that cools the engine 10. The air flow meter 33 detects an intake air amount. The crank angle sensor 34 detects the rotational speed of the engine 10. The air-fuel ratio sensor 35 is provided in the exhaust passage 21 upstream of the catalyst 50. The air-fuel ratio sensor 35 detects the air-fuel ratio of the exhaust gas flowing into the catalyst 50.

The ECU 30 sets the target equivalent ratio by a method described later. The ECU 30 controls the intake air amount and the fuel injection amount so that the equivalent ratio of the air-fuel mixture becomes the target equivalent ratio. The air fuel ratio of the air-fuel mixture is calculated by the ECU 30 based on the detection value of the air fuel ratio sensor 35. Here, the equivalent ratio is an index value representing the fuel concentration in the air-fuel mixture, and is a value obtained by dividing the fuel amount corresponding to the stoichiometric air-fuel ratio by the actual fuel amount. When the air-fuel ratio of the air-fuel mixture is the stoichiometric air-fuel ratio, the equivalent ratio is "one". When the air-fuel ratio of the air-fuel mixture is richer than the stoichiometric air-fuel ratio, the equivalent ratio is a value greater than "one". When the air-fuel ratio of the air-fuel mixture is leaner than the stoichiometric air-fuel ratio, the equivalent ratio is a value smaller than "one". The intake air amount is controlled according to the opening degree of the throttle valve 23. The fuel injection amount is controlled according to the energization time of the in-cylinder injection valve 17. The intake air amount and the fuel injection amount are adjusted based on a target torque that is set according to an accelerator opening degree, a vehicle speed, and the like.

[Equivalent Ratio Control]

Figure 2:
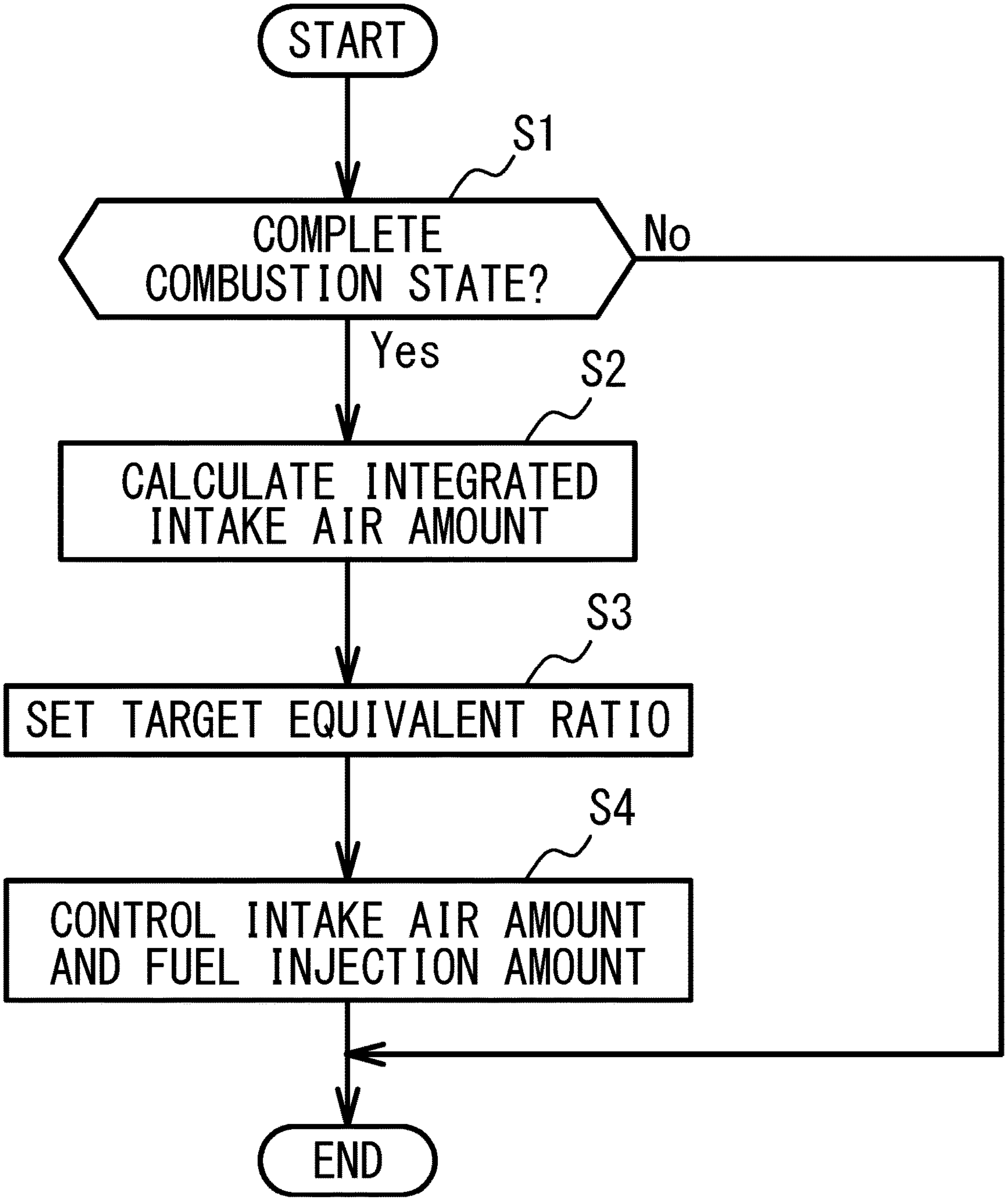
FIG. 2 is a flowchart illustrating an example of equivalent ratio control executed by an ECU.

FIG. 2 is a flowchart illustrating an example of equivalent ratio control executed by the ECU 30. This control is repeatedly executed in the ignition-on state. The ECU 30 determines whether or not the engine 10 is in a complete explosion state (step S1). The complete explosion state means a state in which the start of the engine 10 is completed and the engine 10 can be autonomously operated. In other words, the complete combustion state means a state in which assistance by the starter motor 25 is not required during operation of the engine 10. In the present embodiment, the ECU 30 uses the rotational speed of the engine 10 to determine whether or not the engine 10 is in a complete the engine 10. More specifically, when the rotation speed of the engine 10 becomes equal to or higher than a predetermined rotation speed for a predetermined time or longer, it is determined that the engine 10 is in the complete explosion state. Step S1 is an example of a process executed by a determination unit. When a negative determination is made in step S1, the present control ends.

When an affirmative determination is made in step S1, the ECU 30 calculates the integrated intake air amount based on the detection value of the air flow meter 33 (step S2). That is, the ECU 30 calculates the integrated intake air amount which is an integrated value of the intake air amount after the complete combustion state is determined in step S1. Step S2 is an example of a process executed by a calculation unit.

Figure 3:
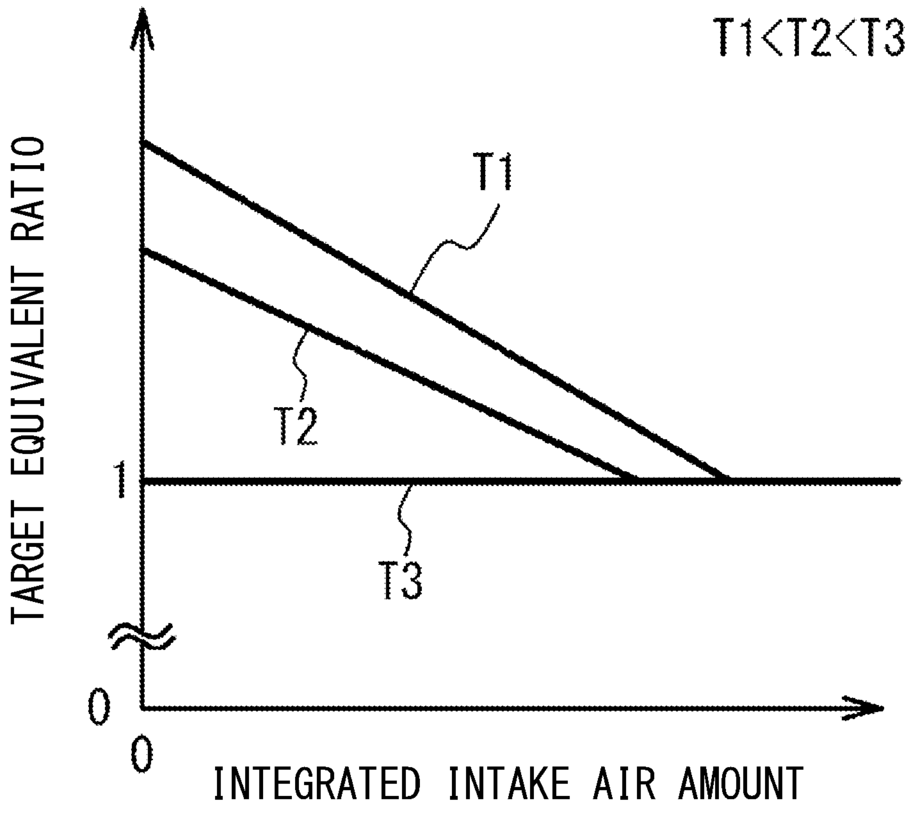
FIG. 3 is an example of a map that defines a target equivalent ratio.

Next, the ECU 30 sets a target equivalent ratio (step S3). FIG. 3 is an example of a map that defines the target equivalent ratio. This map is stored in the memory of the ECU 30. The horizontal axis represents the integrated intake air amount, and the vertical axis represents the target equivalent ratio. In the map of FIG. 3, the target equivalent ratio corresponding to the temperature T1 to T3 of the coolant at the start of cranking of the engine 10 is defined. Among the temperatures T1 to T3, the temperature T1 is the lowest and the temperature T3 is the highest. For example, the temperatures T1 and T2 are less than zero degree Celsius, and the temperature T3 is equal to or higher than zero degree Celsius. The ECU 30 uses the coolant temperature as the temperature of the engine 1. Therefore, the ECU 30 sets the target equivalent ratio by referring to the map illustrated in FIG. 3 based on the coolant temperature detected by the coolant temperature sensor 32 at the start of cranking and the integrated intake air amount. Step S3 is an example of a process executed by a setting unit.

In a state in which the integrated intake air amount is small until reaching the predetermined value, the target equivalent ratio at the temperature T1 is the largest and the target equivalent ratio at the temperature T3 is the smallest among the temperatures T1 to T3. That is, the target equivalent ratio is set to a greater value as the temperature of the engine 10 is lower. The lower the temperature of the engine 10 is lower, the wall surface temperature of the combustion chamber of the engine 10 is lower. As the wall surface temperature becomes lower, the amount of non-contributing fuel that adheres to the wall surface and does not contribute to combustion in the fuel injection amount increases. In order to compensate for this non-contributing fuel amount, the target equivalent ratio is set to a higher value as the temperature of the engine 10 is lower. Further, at the temperature T3, the target equivalent ratio is "one" regardless of the integrated intake air amount. This is because the amount of non-contributing fuel adhering to the wall surface of the combustion chamber is small at the temperature T3.

At the temperatures T1 and T2, the target equivalent ratio decreases toward "one" as the integrated intake air amount increases until the integrated intake air amount reaches a predetermined value. As the integrated intake air amount after the complete combustion state increases, the wall surface temperature of the combustion chamber of the engine 10 increases. As a result, the amount of non-contributing fuel adhering to the wall surface in the fuel injection amount is reduced.

In a case of the temperatures T1 and T2 in FIG. 3, the target equivalent ratio linearly decreases as the integrated intake air amount increases until the integrated intake air amount reaches a predetermined value. However, the target equivalent ratio may also decrease in a curved manner or stepwise. The target equivalent ratio may be calculated by an arithmetic expression using the integrated intake air amount and the temperature of the coolant as arguments.

Next, the ECU 30 controls the intake air amount and the fuel injection amount so that the actual equivalent ratio of the air-fuel mixture becomes the target equivalent ratio (step S4). Specifically, as described above, the ECU 30 controls the opening degree of the throttle valve 23 and the energization time of the in-cylinder injection valve 17. Thus, the intake air amount and the fuel injection amount are controlled. Step S4 is an example of a process executed by the control unit.

As described above, the target equivalent ratio is set based on the integrated intake air amount calculated after the complete combustion state is reached. For this reason, even if there is variation in the time from the start of cranking until the complete combustion state is reached, variation in the target equivalent ratio at the point in time when the complete combustion state is reached is suppressed. As a result, the variation in the combustion state after the start of the engine 10 is suppressed.

For the ECU 30, the temperature of the lubricant oil that lubricates the engine 10 may be used as the temperature of the engine 10. The contents of the above-described embodiment may be applied to, for example, a control device for an engine mounted on a motorcycle or the like, or a control device for an engine mounted on something other than a vehicle such as a ship or a construction machine.

Although some embodiments of the present disclosure have been described in detail, the present disclosure is not limited to the specific embodiments but may be varied or changed within the scope of the present disclosure as claimed.

What is claimed is:

1. An engine control device comprising:

a determination unit configured to determine whether or not an engine is in a complete explosion state;

a calculation unit configured to calculate an integrated intake air amount that is an integrated value of an intake air amount of the engine from a time when an affirmative determination is made by the determination unit after a time of a start of cranking;

a setting unit configured to set a target equivalent ratio of the engine based on the integrated intake air amount and a temperature of the engine at the time of the start of cranking; and a control unit configured to control the intake air amount and a fuel injection amount of the engine such that an equivalent ratio of an air-fuel mixture becomes the target equivalent ratio, wherein the determination unit determines whether or not an engine is in the complete explosion state when a rotation speed of the engine becomes equal to or higher than a predetermined rotation speed for a predetermined time or longer, wherein the temperature of the engine is a coolant temperature of the engine, and wherein when the temperature of the engine is 0 degrees C. or less the setting unit linearly decreases the target equivalent ratio as the integrated intake air amount increases until the integrated intake air amount reaches a predetermined value.

2. The engine control device according to claim 1, wherein the setting unit is configured to decrease the target equivalent ratio as the integrated intake air amount increases.

3. The engine control device according to claim 1, wherein the setting unit is configured to increase the target equivalent ratio as the temperature of the engine decreases.

* * * * *